No. 682,570. Patented Sept. 10, 1901.
H. J. SAGE.
APPARATUS FOR BENDING GLASS.
(Application filed May 11, 1900.)

(No Model.)

WITNESSES

INVENTOR

THE NORRIS PETERS CO., PHOTO-LITHO., WASHINGTON, D. C.

UNITED STATES PATENT OFFICE.

HENRY J. SAGE, OF BEAVER, PENNSYLVANIA, ASSIGNOR TO THE OPALITE TILE COMPANY, OF PITTSBURG, PENNSYLVANIA.

APPARATUS FOR BENDING GLASS.

SPECIFICATION forming part of Letters Patent No. 682,570, dated September 10, 1901.

Application filed May 11, 1900. Serial No. 16,320. (No model.)

*To all whom it may concern:*

Be it known that I, HENRY J. SAGE, of Beaver, in the county of Beaver and State of Pennsylvania, have invented a new and useful Improvement in Apparatus for Bending Glass, of which the following is a full, clear, and exact description, reference being had to the accompanying drawings, forming part of this specification, in which—

Figure 1:
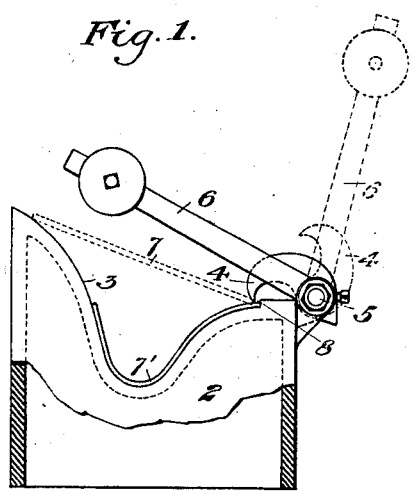
Figure 2:
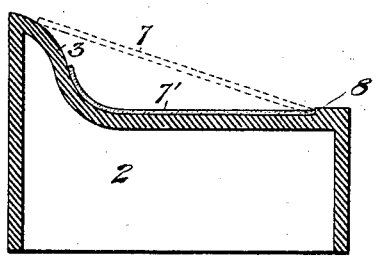

Figure 1 is a side elevation of one form of my improved apparatus adapted to form ogee shapes. Fig. 2 is a cross-section of a modified construction.

The shaping of glass by bending presents in many cases considerable difficulty, especially in bending pieces of narrow width and pieces having compound curves. This is due largely to the difficulty of controlling the glass during the bending operation and keeping it from bending into irregular and improper forms. My invention is designed to overcome these difficulties; and it consists in a bending-matrix having a stop and preferably also a clamp for holding the glass to be bent, so as to preserve it in proper position relatively to the matrix, and thus to insure its settling down regularly when it has been softened by heat.

In Fig. 1 of the drawings, 2 represents a matrix-block having a surface cavity of the shape to be given to the glass. One side 3 of this cavity extends upwardly and outwardly beyond the limits of the matrix or portion of the cavity occupied by the bent-glass article, so as to constitute a guide, and at the other side of the cavity there is a clamp or holder 4, which consists of a curved bar or flange, pivoted at 5 at each end of the matrix and extending the entire length of such matrix and adapted to bear down upon the margin of the glass to be bent. Suitable pressure for this purpose is applied by weighted arms 6.

The piece of glass 7 to be bent is placed upon the matrix-block in the position shown in Fig. 1, one edge of the glass abutting against a stop-shoulder 8 and being held by the clamp 4 and the other edge free and resting on the extended guide-surface 3. The block 2, with the glass, is placed in a heating-furnace, and when the glass softens it sinks down into the matrix-cavity, taking finally the form shown in full lines at 7'. The glass is controlled during bending by the guiding-surface 3 and by the clamp, so that it is obliged to sink into the proper position in the matrix-cavity and to assume the precise form desired, whereas without these elements of my invention the glass being uncontrolled would be apt to be bent irregularly. The mold shown in the drawings gives an article of a compound curve designed as a molding for glass tiles; but it will be understood that articles of other forms may be made by modifying the shape of the apparatus.

In Fig. 2 I show a modification of my invention in which I omit the clamp and employ only the stop-shoulder 8, against which the edge of the glass is abutted. At the opposite end of the matrix-cavity from the stop-shoulder is a guiding-surface 3, and when the glass is placed upon the matrix, with its end resting against the stop-shoulder, it will be prevented thereby from moving at said end, and the opposite end will sink down along the guiding-surface 3 until the glass is finally bent and occupies the position shown by dotted lines at 7'.

I claim—

1. Bending apparatus for glass comprising a matrix and a clamp adapted to hold an end of the glass the opposite end being free; substantially as described.

2. Bending apparatus for glass comprising a matrix and a clamp adapted to hold the end of the glass, said clamp comprising a pivoted finger and weight; substantially as described.

3. Apparatus for bending glass comprising a matrix having a guiding-surface extending beyond the matrix-cavity, and a clamp for holding the glass opposite to the guiding-surface; substantially as described.

4. Apparatus for bending glass comprising a matrix, having at one end a stop for the glass, and opposite thereto a guiding-surface extending beyond the matrix-cavity; substantially as described.

In testimony whereof I have hereunto set my hand.

HENRY J. SAGE.

Witnesses:
 THOMAS W. BAKEWELL,
 H. M. CORWIN.